(12) United States Patent
Marlett et al.

(10) Patent No.: US 9,897,025 B2
(45) Date of Patent: Feb. 20, 2018

(54) METHOD FOR CONTROLLING AN INTERNAL COMBUSTION ENGINE

(71) Applicant: GM GLOBAL TECHNOLOGY OPERATIONS LLC, Detroit, MI (US)

(72) Inventors: Chad E. Marlett, Plymouth, MI (US); James L. Meyer, Howell, MI (US); Jianwen Li, West Bloomfield, MI (US); Marco Girotto, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 76 days.

(21) Appl. No.: 14/674,696

(22) Filed: Mar. 31, 2015

(65) Prior Publication Data

US 2016/0290260 A1 Oct. 6, 2016

(51) Int. Cl.

| F01N 11/00 | (2006.01) |
|---|---|
| F01N 3/20 | (2006.01) |
| F02D 41/02 | (2006.01) |
| F02D 41/06 | (2006.01) |
| F02D 41/14 | (2006.01) |
| F02D 41/22 | (2006.01) |
| F01N 9/00 | (2006.01) |

(52) U.S. Cl.
CPC ......... *F02D 41/024* (2013.01); *F01N 3/2006* (2013.01); *F01N 3/208* (2013.01); *F01N 3/2066* (2013.01); *F01N 9/00* (2013.01); *F01N 11/002* (2013.01); *F02D 41/062* (2013.01); *F02D 41/064* (2013.01); *F02D 41/1494* (2013.01); *F02D 41/222* (2013.01); *F01N 2560/20* (2013.01); *F01N 2900/1404* (2013.01); *Y02T 10/24* (2013.01); *Y02T 10/26* (2013.01); *Y02T 10/47* (2013.01)

(58) Field of Classification Search
CPC ............... F01N 11/002; F01N 2550/22; F01N 2560/023; F01N 2560/028; F01N 2560/20; F01N 13/008; F01N 2900/0416; F01N 3/2006; F01N 3/2066; F01N 3/208; F01N 9/00; F01N 2900/1404; F02D 41/1441; F02D 41/024; F02D 41/062; F02D 41/064; F02D 41/1494; F02D 41/222; Y02T 10/24; Y02T 10/26; Y02T 10/47

See application file for complete search history.

(56) References Cited

U.S. PATENT DOCUMENTS

| 4,938,196 A | * | 7/1990 | Hoshi | F02D 41/1494 123/697 |
|---|---|---|---|---|
| 5,590,521 A | * | 1/1997 | Schnaibel | F01N 9/005 374/E7.042 |

(Continued)

*Primary Examiner* — Brandon Lee
(74) *Attorney, Agent, or Firm* — Quinn IP Law

(57) ABSTRACT

A direct fuel injection internal combustion engine fluidly coupled to an exhaust aftertreatment system is described and includes a plurality of fluidly coupled exhaust purifying devices and an exhaust gas sensor. A method of controlling the engine includes, activating, via a heater controller, a heating element of the exhaust gas sensor in response to starting the internal combustion engine. An exhaust gas feedstream is monitored to determine a temperature of the exhaust gas sensor. Engine control to effect heating of one of the exhaust purifying devices is permitted only when a temperature of the exhaust gas sensor is greater than a threshold temperature.

6 Claims, 2 Drawing Sheets

(56) References Cited

U.S. PATENT DOCUMENTS

| | | | | |
|---|---|---|---|---|
| 6,935,101 B2* | 8/2005 | Morinaga | ............ | G01N 27/4067 123/685 |
| 7,968,827 B2* | 6/2011 | Adams | ................ | F02D 41/1494 123/672 |
| 8,176,729 B2* | 5/2012 | Ren | ...................... | B01D 53/944 60/274 |
| 2001/0054608 A1* | 12/2001 | Ohkuma | ............. | F02D 41/1494 219/205 |
| 2009/0266059 A1* | 10/2009 | Kesse | ..................... | F01N 3/208 60/295 |
| 2010/0101218 A1* | 4/2010 | Gabe | .................. | F01N 13/0093 60/286 |
| 2011/0166745 A1* | 7/2011 | Tiwari | .............. | B60W 50/0225 701/29.2 |

\* cited by examiner

METHOD FOR CONTROLLING AN INTERNAL COMBUSTION ENGINE

TECHNICAL FIELD

This disclosure relates to internal combustion engines and methods and apparatuses for their control.

BACKGROUND

Internal combustion engines fluidly couple to exhaust aftertreatment systems that purify exhaust gases generated as a byproduct of combustion. Exhaust aftertreatment systems may include oxidation catalysts, reduction catalysts, selective catalytic reduction catalysts and particulate filters.

Internal combustion engines also employ sensors to monitor an entrained exhaust gas feedstream for purposes of engine control and diagnostics. Known sensors include zirconium-based oxygen sensors, wide-range lambda sensors, and constituent sensors such as NOx sensors. Such sensors may include integrated electrical heaters to heat a sensing element, thus improving measurement repeatability.

Sensors monitoring an exhaust gas feedstream may experience fouling caused by deposition of unburned hydrocarbons and particulate matter. Such fouling may occur under low temperature operating conditions, such as immediately after engine cold starting. Such fouling may also occur during execution of engine operating conditions that include running in a rich air/fuel condition to generate unburned hydrocarbons that flow into an oxidation catalyst for heat generation upstream of a selective catalytic reduction catalyst. Particulate matter may be generated in an internal combustion engine operating in a compression-ignition state.

SUMMARY

A direct fuel injection internal combustion engine fluidly coupled to an exhaust aftertreatment system is described and includes a plurality of fluidly coupled exhaust purifying devices and an exhaust gas sensor. A method of controlling the engine includes activating, via a heater controller, a heating element of the exhaust gas sensor in response to starting the internal combustion engine. An exhaust gas feedstream is monitored to determine a temperature of the exhaust gas sensor. Engine control to effect heating of one of the exhaust purifying devices is permitted only when a temperature of the exhaust gas sensor is greater than a threshold temperature.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
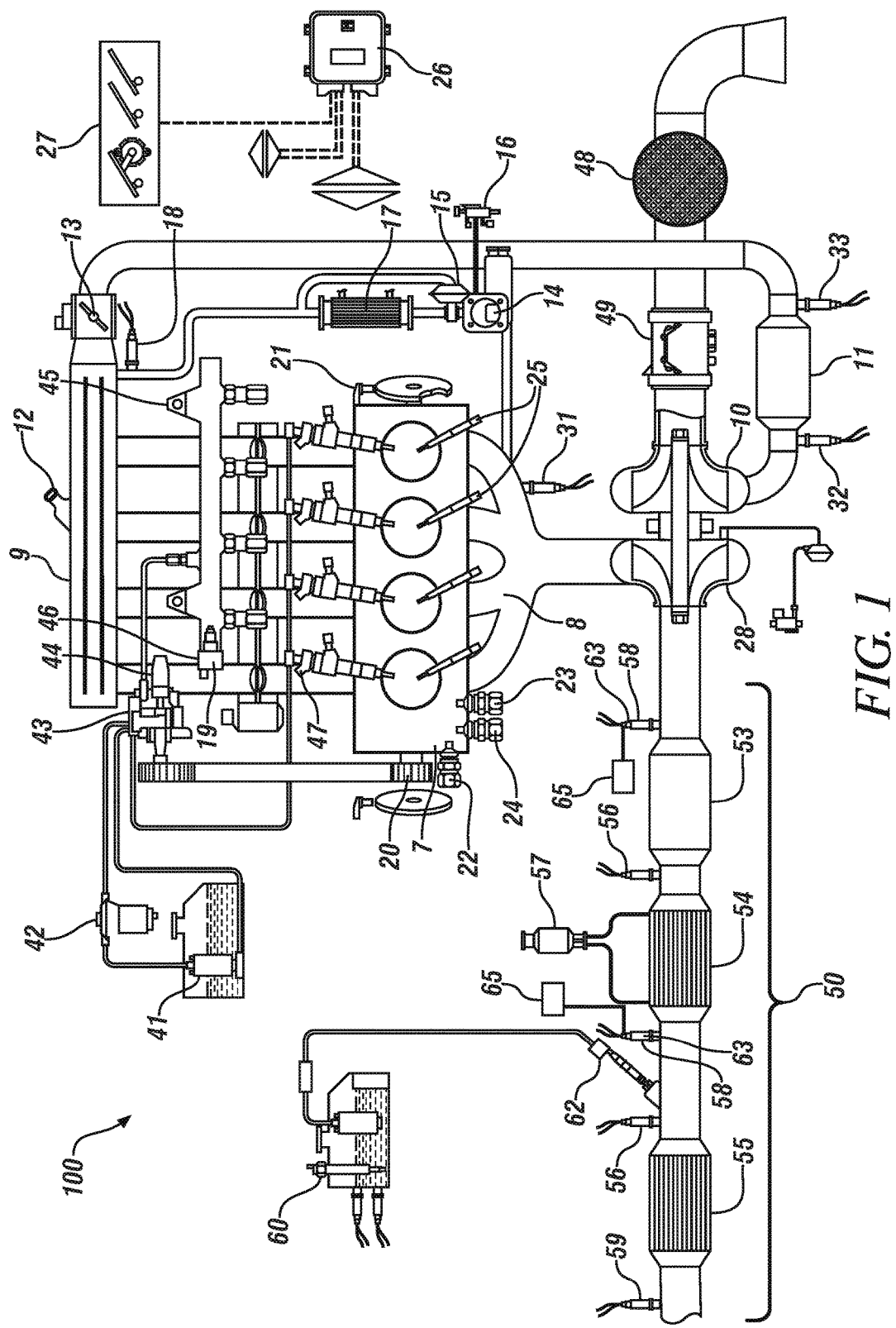
FIG. 1 schematically illustrates an internal combustion engine including an exhaust gas aftertreatment system, in accordance with the disclosure.

Referring now to the drawings, wherein the depictions are for the purpose of illustrating certain exemplary embodiments only and not for the purpose of limiting the same, FIG. 1 schematically illustrates an internal combustion engine (engine) 100 including an exhaust aftertreatment system 50 that is arranged in accordance with an embodiment of this disclosure. The engine 100 is a multi-cylinder internal combustion engine that combusts a mixture of directly-injected fuel, intake air and recirculated exhaust gas to generate mechanical power. The engine 100 is configured to operate with compression-ignition combustion as shown, although the concepts described herein may be employed on other engine configurations that employ heated exhaust gas sensors such as lambda or NOx sensors and execute post-combustion fuel injection to heat exhaust purifying devices of an exhaust aftertreatment system. The engine 100 may be employed on a ground vehicle, e.g., a passenger car, truck, agricultural vehicle or a construction vehicle, on a marine vehicle, or in a stationary setting, e.g., coupled to an electric power generator.

The engine 100 preferably includes a multi-cylinder engine block 7, an intake manifold 8 for channeling intake air to the cylinders of the engine 100, and an exhaust manifold 9 for entraining exhaust gas for channeling through the exhaust aftertreatment system 50. Other unillustrated engine components and systems include pistons, crankshaft, engine head(s), intake valves, exhaust valves, camshaft(s), and variable cam phasers when employed. The engine 100 preferably operates in a four-stroke combustion cycle of repetitively-executed strokes of intake-compression-combustion-exhaust. A variable geometry turbocharger (VGT) includes a turbine 28 that fluidly couples to the exhaust manifold 9 upstream of the exhaust aftertreatment system 50 in one embodiment. The engine 100 includes a plurality of direct-injection fuel injectors 47 that are arranged to directly inject fuel into individual combustion chambers. The injectors 47 may be any suitable direct-injection device, and are solenoid-activated devices in one embodiment. Fuel is supplied to the injectors 47 from a fuel storage tank via a low-pressure fuel pump 41, a fuel filter assembly 42, a high-pressure fuel pump 43, a fuel metering valve 44, a fuel rail 45 and a pressure regulating valve 46. Each of the engine cylinders preferably includes a glow plug 25. The engine 100 includes an intake air system, which may include an intake air filter 48, a mass air flow sensor 49, a compressor 10 of the VGT, a charge air cooler 11, a throttle valve 13, a sensor 12 for monitoring boost pressure and intake air temperature, and other sensing devices as may be useful. The engine 100 may include an exhaust gas recirculation (EGR) system that fluidly channels exhaust gas from the exhaust manifold 9 to the intake manifold 8. In one embodiment, the EGR system may include an EGR valve 14, an EGR cooler 17 including a bypass valve 15, an EGR outlet temperature sensor 18, an EGR cooler inlet temperature sensor 31 and a vacuum switch 16. The intake manifold 8 may also include a plurality of swirl valves 19 for mixing intake air and the recirculated exhaust gas. Other engine monitoring sensors may include a crankshaft position sensor 20, a camshaft position sensor 21, a coolant temperature sensor 22, an oil level switch 23 and an oil pressure switch 24, among others. One or more engine monitoring sensors may be replaced with a suitable executable model.

An engine controller 26 monitors various sensing devices and executes control routines to command various actuators to control operation of the engine 100 in response to operator commands. Operator commands may be determined from various operator input devices, including, e.g., a pedal assembly 27 that includes, by way of example, an accelerator pedal and a brake pedal. Other sensing devices associated with engine operation may include, by way of example only, a barometric pressure sensor, an ambient air temperature sensor 30, a VGT position sensor, the exhaust gas temperature sensor 31, an air charge inlet temperature sensor 32 and an air charge outlet temperature sensor 33, among others.

The exhaust aftertreatment system 50 includes a plurality of fluidly connected exhaust purifying devices for purifying engine exhaust gas prior to expulsion to ambient air. An exhaust purifying device may be any device configured to oxidize, reduce, filter or otherwise treat constituents of the exhaust gas feedstream, including but not limited to hydrocarbons, carbon monoxide, nitrides of oxygen (NOx), and particulate matter. Such exhaust purifying devices may include an oxidation catalyst 53, a particulate filter 54 and a selective catalyst reduction device (SCR) 55, which may be supplied with reductant from a reductant delivery system 60 including an injection nozzle 62 positioned in the exhaust gas feedstream upstream thereto. In one embodiment, the SCR 55 is a urea-based device, and the injected reductant is urea. When the engine 100 is employed on a ground vehicle, the oxidation catalyst 53 may be closely coupled to the exhaust manifold 9 and located within an engine compartment, and the particulate filter 54 may be closely coupled to the oxidation catalyst 53 with the SCR 55 downstream in an underfloor location. The embodiment shown includes the elements of the exhaust aftertreatment system 50 in one arrangement, which is illustrative. In one alternative arrangement, the particulate filter 54 may be arranged upstream of the oxidation catalyst 53. In one embodiment, the particulate filter 54 and the oxidation catalyst 53 may be collocated on a single substrate and/or collocated in a single mechanical assembly. Other arrangements of the elements of the exhaust aftertreatment system 50 may be employed within the scope of this disclosure, with such arrangements including addition of other exhaust purifying devices and/or omission of one or more of the exhaust purifying devices, depending upon requirements of the specific application.

Sensors for monitoring the exhaust purifying devices of the exhaust aftertreatment system 50 preferably include an exhaust gas sensor 58, a particulate matter sensor 56, and a delta pressure sensor 57 for monitoring pressure drop across the particulate filter 54, a temperature sensor 59, and/or other suitable sensing devices and models for monitoring the exhaust gas feedstream. The exhaust gas sensor 58 may be an engine-out NOx sensor, a wide-range lambda sensor, or another suitable exhaust gas sensing device. Such sensors and models may be arranged to monitor or otherwise determine parameters associated with performance of individual ones of the exhaust purifying devices, monitor parameters associated with performance of a subset of the exhaust purifying devices, or monitor parameters associated with performance of the overall exhaust aftertreatment system 50. The exhaust gas sensor 58 is preferably arranged to monitor the exhaust gas feedstream upstream of the oxidation catalyst 53. Alternatively, or in addition, the exhaust gas sensor 58 may be arranged to monitor the exhaust gas feedstream downstream of the oxidation catalyst 53.

The exhaust gas sensor 58 may be fabricated as a planar-type zirconium oxide dual cell device having a sensing element and an integrated electrically-powered heating element 63. A heater controller 65 electrically connects to the heating element 63 of the exhaust gas sensor 58 to control electrical power thereto. The heater controller 65 controls electric power to the heating element 63 to maintain the temperature of the sensing element of the exhaust gas sensor 58 within a predetermined temperature range. The heater controller 65 controls electric power to the heating element 63 employing any suitable voltage control routine, including, e.g., a pulsewidth-modulated control routine. During initial engine operation, the heater controller 65 controls electric power to the heating element 63 in a manner that limits thermal shock to the exhaust gas sensor 58 that may be caused by impingement of water or other liquids present in the exhaust gas feedstream. This may be referred to as a condensation water phase of operation.

Engine control includes controlling various engine operating parameters, including controlling preferred engine control states to minimize various exhaust gas constituents through chemical reaction processes that include, by way of non-limiting examples, oxidation, reduction, filtering, and selective reduction. Other engine control states include controlling operating parameters to warm-up the engine 100 and transfer heat or otherwise warm up various ones of the exhaust purifying devices of the aftertreatment system 50 in a timely fashion so as to rapidly effect their operation, thus minimizing cold-start emissions.

In one embodiment, a process for effecting rapid warm-up of the SCR 55 may include passing unburned hydrocarbons into the exhaust gas feedstream to flow to the oxidation catalyst 53 to oxidize therein to increase temperature of the exhaust gas feedstream as it enters the SCR 55. One engine control process that may cause unburned hydrocarbons to pass into the exhaust gas feedstream includes post-combustion fuel injection events. A post-combustion fuel injection event is any fuel injection event during a portion of the combustion cycle when fuel is injected into a combustion chamber after a combustion event, resulting in unburned fuel in the combustion chamber that may pass into the exhaust gas feedstream to the aftertreatment system 50. This may include injecting fuel late in each combustion stroke or during an exhaust stroke by activating the fuel injectors 47.

Unburned hydrocarbons in the form of liquefied raw fuel may impinge upon the exhaust gas sensor 58 when it is located upstream of the oxidation catalyst 53. Furthermore, unburned hydrocarbons in the form of liquefied raw fuel may impinge upon the exhaust gas sensor 58 when it is located downstream of the oxidation catalyst 53 when the oxidation catalyst 53 has not achieved a light-off or exothermic state. Such unburned hydrocarbons may condense onto the sensing element or an outer shield of the exhaust gas sensor 58 and interfere with its ability to accurately monitor the exhaust gas feedstream. The hydrocarbon condensate may further solidify onto the sensing element of the exhaust gas sensor 58, rendering it ineffective to perform its intended function of monitoring the exhaust gas feedstream. Furthermore, water vapor, which can entrain particulate matter, may condense onto the sensing element or the outer shield of the exhaust gas sensor 58 and also interfere with its ability to accurately monitor the exhaust gas feedstream. A minimum threshold temperature for the exhaust gas sensor 58 can be determined, with the minimum threshold temperature being a temperature sufficient to prevent such condensation of fuel and/or water vapor. The minimum threshold temperature relates to a fuel or water dew point, wherein the dew point relates to a temperature at which a vaporized liquid forms into a liquid state and condenses onto a surface.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communications between controllers and between controllers, actuators and/or sensors may be accomplished using a direct wired link, a networked communications bus link, a wireless link or any other suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. The term 'model' refers to a processor-based or processor-executable code and associated calibration that simulates a physical existence of a device or a physical process. As used herein, the terms 'dynamic' and 'dynamically' and related terms describe steps or processes that are executed in real-time and are characterized by monitoring or otherwise determining states of parameters and regularly or periodically updating the states of the parameters during execution of a routine or between iterations of execution of the routine. In one embodiment, this includes as follows.

Figure 2:
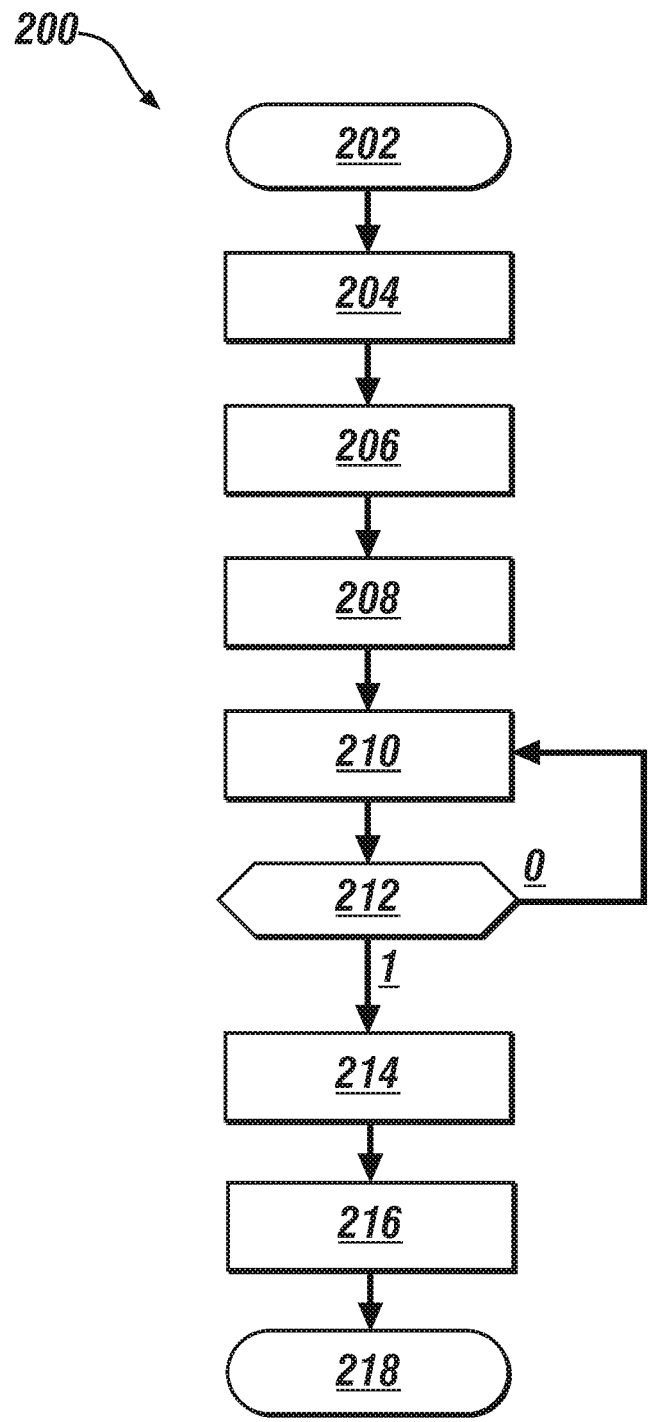
FIG. 2 schematically illustrates a sensor heater control routine employing an embodiment of the engine described with reference to FIG. 1, in accordance with the disclosure.

FIG. 2 schematically shows a sensor heater control routine 200 employing an embodiment of the engine 100 described hereinabove. The sensor heater control routine 200 is preferably periodically executed by the engine controller 26 as one or more instruction sets and accompanying calibrations during engine operation. An intent of the sensor heater control routine 200 is to ensure that the exhaust gas sensor 58 is sufficiently heated to minimize or preferably completely prevent condensation of fuel vapor and/or water vapor including entrained particulate matter from condensing or depositing thereon. Table 1 is provided as a key wherein the numerically labeled blocks and the corresponding functions are set forth as follows, corresponding to the sensor heater control routine 200.

TABLE 1

| LOCK | BLOCK CONTENTS |
|---|---|
| 202 | Engine start |
| 204 | Control sensor heater to low power level |
| 206 | Disable post-combustion fuel injection |
| 208 | Monitor engine operation |
| 210 | Determine sensor temperature, Texh |
| 212 | Is Texh > minimum threshold |
| 214 | Increase sensor heater power |
| 216 | Permit/Enable post-combustion fuel injection |
| 218 | End |

The sensor heater control routine 200 preferably executes in response to an engine start event (202), including cold engine start events and engine autostart events when the engine 100 is employed on a vehicle or another system that executes autostop/autostart events. Alternatively, the sensor heater control routine 200 may only execute during a cold engine start event and may not execute during autostart events. This may occur, for example, on engine systems wherein the heater controller 65 continues to supply electrical power to the heating element 63 of the exhaust gas sensor 58 during engine autostop events.

Upon starting the engine 100, the heater controller 65 initially controls electrical power to the heating element 63 of the exhaust gas sensor 58 at a low electric power level. In one embodiment, the electric power level is controlled by controlling electric voltage level, and thus a low power level is controlled by controlling voltage to a low voltage level, e.g., 2.3V in a nominal 12 Vdc electrical system (204). One purpose in initially controlling the electrical power to the heating element 63 of the exhaust gas sensor 58 to a low power level is to reduce likelihood of thermal shock damage caused by impingement of liquefied fluids, e.g., water, onto the heating element 63 of the exhaust gas sensor 58. Engine control also includes disabling any post-combustion fuel injection events (206). A post-combustion fuel injection event is any fuel injection event during an engine combustion cycle when fuel is injected into a combustion chamber after a combustion event, resulting in unburned fuel in the combustion chamber that may pass into the exhaust gas feedstream and flow towards the aftertreatment system 50.

Engine operation is monitored (208), which includes monitoring signal outputs of various sensing devices and monitoring commands to various actuators to control operation of the engine 100 in response to operator commands, e.g., as determined employing the pedal assembly 27.

The monitored engine operation is employed to estimate a temperature in the exhaust gas feedstream that relates to a condensate location (210), e.g., a temperature on an area of the exhaust gas sensor 58 on which water and/or fuel condensates may condense and deposit. Such deposits may lead to fouling and/or plugging and consequent loss of measurement capability of the exhaust gas sensor 58 under some conditions. In one embodiment, the monitored engine operation is employed in an energy model that predicts an amount of heat energy passed to the exhaust gas sensor 58 based upon exhaust gas flow and exhaust gas temperature. The development and implementation of a suitable energy model to determine heat transfer based upon exhaust gas flow and temperature is known. Implementation of such an energy model may be application-specific, with flow characteristics and exhaust gas and sensor temperature models developed during pre-production testing or under other suitable conditions.

A minimum threshold temperature for the exhaust gas sensor 58, Texh, can be determined, and is a temperature that minimizes or prevents condensation of fuel and/or water vapor to prevent deposition of matter thereon.

When the estimated sensor temperature is below the minimum threshold temperature (212)(0), the initial operation continues with continued monitoring of the engine operation to estimate the temperature in the exhaust gas feedstream that relates to the condensate location (208, 210).

When the estimated sensor temperature is greater than or equal to the minimum threshold temperature (212)(1), the initial operation discontinues. The heater control 65 increases the sensor heater power to its maximum voltage, e.g., 7.5V in a nominal 12 Vdc system (214). Post-combustion fueling is permitted (216), and this iteration of the sensor routine 200 ends (218). The post-combustion fueling may be part of an overall engine control scheme to dynamically control operation of the engine 100 to increase the exhaust temperature to increase temperature of one or more of the exhaust purifying devices of the exhaust aftertreatment system 50.

The sensor heater control routine 200 inhibits post-combustion fueling until the exhaust gas sensor 58 has achieved a minimum temperature threshold to reduce sensor fouling. The internal heating of the exhaust gas sensor 58 may thus aid in hydrocarbon vaporization when activated during the periods of peak hydrocarbon emissions. Thus, post-combustion fueling to effect temperature increase in one of the exhaust purifying devices of the exhaust aftertreatment system 50 is linked to achieving a dew point release for the exhaust gas sensor 58. This linked release may allow some measures of rapid-heat up to proceed, while the post-combustion fueling is delayed until the sensor heating is activated.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a direct fuel injection internal combustion engine fluidly coupled to an oxidation catalyst upstream of a selective catalytic reduction catalyst, the method comprising:

immediately activating, via a heater controller, a heating element of an exhaust gas sensor arranged to monitor an exhaust gas feedstream from the internal combustion engine in response to starting the internal combustion engine, by initially activating, via the heater controller, the heating element of the exhaust gas sensor at a low power level, wherein the low power level is selected based upon thermal shock; and then activating, via the heater controller, the heating element of the exhaust gas sensor at an increased power level in relation to the low power level when a temperature of the exhaust gas sensor is greater than a threshold temperature;

monitoring temperature and flow of the exhaust gas feedstream of the engine;

determining the temperature of the exhaust gas sensor based upon the monitoring of the exhaust gas feedstream, and enabling engine control to effect heating of the selective catalytic reduction catalyst only when the temperature of the exhaust gas sensor is greater than the threshold temperature by executing post-combustion fuel injection events, wherein the threshold temperature is associated with hydrocarbon vaporization.

2. The method of claim 1, wherein the exhaust gas sensor comprises either a lambda sensor or a NOx sensor.

3. The method of claim 1, wherein the exhaust gas sensor is downstream of the oxidation catalyst.

4. The method of claim 1, wherein the exhaust gas sensor is upstream of the oxidation catalyst.

5. The method of claim 1, wherein the starting the internal combustion engine comprises a key-on starting event.

6. The method of claim 1, wherein the starting the internal combustion engine comprises an autostarting event.

* * * * *